United States Patent [19]

Teer et al.

[11] 3,969,297
[45] July 13, 1976

[54] CLEAR ETHYLENE POLYMER EMULSIONS HAVING PARTICLE SIZE LESS THAN 100 ANGSTROM UNITS AND POLISHES CONTAINING THE SAME

[75] Inventors: Glenn E. Teer; Jerry G. Higgins; George D. Warren, all of Big Spring, Tex.

[73] Assignee: Cosden Technology, Inc., Big Spring, Tex.

[22] Filed: Jan. 14, 1975

[21] Appl. No.: 540,848

[52] U.S. Cl. .................. 260/29.6 XA; 260/29.1 R; 260/29.6 T; 260/29.6 RB; 260/29.6 RW; 526/223; 526/224; 526/225; 526/317; 526/329; 526/339
[51] Int. Cl.² ........................................ C08F 110/02
[58] Field of Search ............ 260/29.6 TA, 29.6 XA, 260/29.6 H, 94.9 A, 29.6 RB, 29.6 RW, 29.1 R

[56] References Cited
FOREIGN PATENTS OR APPLICATIONS
1,099,314  1/1968  Germany ..................... 260/29.6 XA
215,502  3/1968  U.S.S.R. ..................... 260/29.6 XA Primary Examiner—Joseph L. Schofer
Assistant Examiner—Peter F. Kulkosky

[57] ABSTRACT

Emulsions of ethylene homopolymer and/or copolymers are provided which are remarkably clear and have a light transmission of at least about 95%, and contain particles which have an average size no greater than about 100 angstrom units. These emulsions are produced by polymerizing ethylene, or ethylene with at least one other alpha unsaturated monomer in aqueous medium in the presence of an effective amount of a water soluble persulfate initiator, from about 2 to about 5 percent by weight based on the aqueous medium of an alkyl aryl sulfonate surfactant, and from about 0.3 to about 0.7 percent by weight based on the aqueous medium of an alkyl mercaptan. The resulting clear emulsions are combined with clear polish latexes such as acrylic latexes to form clear polish compositions.

17 Claims, No Drawings

CLEAR ETHYLENE POLYMER EMULSIONS HAVING PARTICLE SIZE LESS THAN 100 ANGSTROM UNITS AND POLISHES CONTAINING THE SAME

BACKGROUND OF THE INVENTION

This invention relates to emulsions of polymeric materials. In another aspect, this invention relates to novel optically clear stable emulsions formed with ethylene homopolymers and/or copolymers. In still another aspect, this invention relates to novel, optically clear liquid polish formulations which contain emulsions of ethylene polymers.

Various polymeric emulsions are known in the art which are used as polishes, coatings and other similar surface treating compositions. Emulsions of oxidized polyethylene have been widely used in such polish formulations. The oxidized polyethylenes were produced by telomerization of ethylene and subsequent oxidation of the telomer, or by thermal degradation of high molecular weight polyethylenes to low molecular weight products which are then oxidized as disclosed in U.S. Pat. No. 2,964,487 and 2,928,797. The hydrophilic oxygenated groups on the resulting oxidized polymeric particles allow the particles to be emulsified. Such emulsions rarely have a molecular weight more than about 3000. However, the oxygenated polyethylene materials have a disagreeable odor which taints the emulsions prepared therefrom and the products which contain such emulsions. Furthermore, these emulsions typically have a yellow tinge.

Improved stable polyethylene emulsions which have found satisfactory use in coatings, lacquers, paints and polishes and which do not have the inherent disagreeable odor or color of the oxidized polyethylenes, have been produced by emulsion polymerization techniques such as set forth in U.S. Pat. Nos. 3,226,352, 3,244,652 and 3,352,807. These emulsions polymerized polyethylenes have molecular weights ranging from about 7000 to about 40,000 and particle sizes ranging broadly from about 200 angstroms to about 5,000 angstrom units with the average particle size of the particles being 500 angstrom units or more. However, these emulsion polymerized polyethylenes generally have a milky translucent color. Perhaps the clearest of such emulsions are produced by the process set forth in U.S. Pat. No. 3,352,807 and are disclosed to have a light transmission of from about 40% to about 90% (on a sample diluted to 0.06% solids) and as determined by a conventional Bausch & Lomb "Spectronic 20" spectrophotometer using distilled water as the 100% transmission calibration standard and utilizing a wave length of 400 millimicrons. However, even these emulsions contain a milky tint or hue and cannot be satisfactorily combined with normally water clear coating compositions without forming a translucent coating or polish composition.

STATEMENT OF THE INVENTION

According to the invention, improved emulsions of ethylene homopolymers and/or copolymers are provided which possess an extremely clear optical clarity, e.g., a "water clear" optical clarity and have average polymer particle sizes no greater than about 100 angstroms. These improved emulsions are produced by a process whereby the polymerization of the ethylene homopolymer or copolymers occurs in an aqueous medium in the presence of a water soluble persulfate initiator, a minor effective amount of alkyl aryl sulfonate emulsifier and a minor effective amount of an alkyl mercaptan.

According to one embodiment of the subject invention, the improved novel clear emulsions are made from a terpolymer of ethylene, an acrylic compound and an alpha olefin which has from about 3 to about 24 carbon atoms.

According to still another embodiment of the subject invention, novel optically clear polish and coating formulations are provided which contain the clear ethylene polymer emulsions of the subject invention as a prime ingredient thereof.

DETAILED DESCRIPTION OF THE INVENTION

The improved emulsions are produced in accordance with the invention either under batch or continuous process conditions by contacting pressurized ethylene with an aqueous medium which contains a water soluble persulfate initiator, an alkyl mercaptan, and an anionic emulsifier selected from alkyl aryl sulfonates. In addition, if desired, one or more alpha unsaturated monomer can also be contacted with the ethylene to form copolymers thereof. It has been found that in order to obtain clear emulsions, the amount of the anionic emulsifier and the alkyl mercaptan within the aqueous polymerization medium must be closely regulated. When this is accomplished, emulsions can be produced in accordance with this invention which have a polymer particle size of no greater than about 100 angstroms and have a light transmission of at least 95%. It is noted that the phrase "light transmission" as used in the scope of the subject invention is herein understood to be the percent of light that is passed through the emulsion containing at least 15 weight percent solids when utilizing the conventional Bausch and Lomb "Spectronic 20" spectrophotometer while using distilled water as 100 percent transmission calibration standard, and utilized a wave length of 620 millimicrons using a ½ inch transmission cell.

It is preferred that the emulsions produced in accordance with the subject invention have a light transmission of at least 99% and most preferably of greater than 99%.

Contact of the ethylene with the aqueous medium is made under greater than atmospheric pressure and at an elevated temperature. Generally, the reaction can occur at a pressure in the range of from about 1500 to about 4500 psi and preferably in a range from about 1550 to about 3000 psi. In addition, the process can be carried out at a temperature in the range of from about 70°C to about 120°C and preferably from about 85°C to about 95°C.

Generally, only a minor catalytic amount of the water soluble persulfate initiator need be present in the aqueous reaction medium. Examples of suitable persulfate initiators include alkali metal persulfates including potassium and sodium persulfate and any other water soluble persulfate, e.g., ammonium persulfate and the like. The amount of initiator can vary depending upon whether homopolymerization or copolymerization of ethylene is taking place. The initiator can be used in amounts ranging from about 0.1 to about 0.70 percent by weight based on the liquid reaction medium.

The anionic emulsifiers which can be used in the scope of the subject invention include the alkali metal salt and particularly the sodium and potassium salts of alkyl aryl sulfonic acids and preferably the alkali metal alkyl benzene sulfonates wherein the alkyl group is a straight or branched chain which contains from about 6 to about 18 carbon atoms. Examples of suitable such materials include sodium and potassium salts of dodecyl benzene sulfonic acid, nonyl benzene sulfonic acid, undecyl benzene sulfonic acid, tetradecyl benzene sulfonic acid, hexadecyl benzene sulfonic acid, mixtures thereof and the like. The anionic emulsifier should be present in an amount in the range of from about 2 to about 6% by weight of the aqueous reaction medium and more preferably from about 3 to about 5 percent by weight of the aqueous reaction medium.

The alkyl mercaptan which is utilized in the process of the subject invention can be any alkyl mercaptan having the general structural formula of RSH wherein R can be any straight or branched chain alkyl radical having from about 4 to about 20 carbon atoms. The preferred alkyl mercaptans have an alkyl group of at least 10 carbon atoms and at least one branch in the chain. The most preferred alkyl mercaptan utilized in the scope of the subject invention is tertiary dodecyl mercaptan. Examples of other suitable mercaptans which can be used in the scope of the invention include:

Normal-Dodecyl Mercaptan
Dithiobis(benzothiazole)
Tertiary-Nonyl Mercaptan
Benzyl Mercaptan
p-Chlorobenzyl Mercaptan The alkyl mercaptan can be present in an amount in the range of from about 0.3 to about 0.7 percent by weight of the aqueous medium and is preferably present in an amount of about 0.4–0.5 percent by weight of the aqueous medium. It is noted in this regard that when alkyl mercaptans are utilized which have an alkyl group having below about 10 carbon atoms and no branching on the chain, many times it is necessary to add further amounts of these materials as the polymerization progresses because they tend to be consumed at a faster rate in the reaction than do the most preferred long branched chain alkyl mercaptans. Thus, the aqueous reaction medium should contain from about 0.3 to about 0.6 percent by weight of the alkyl mercaptan therewithin as the reaction proceeds.

In addition, the ethylene can be copolymerized with another alpha unsaturated monomer or monomers. The other alpha unsaturated monomer can comprise from 2 to about 25 weight percent of the resulting copolymer. The other alpha unsaturated monomer can either be introduced as gas with the ethylene or the other monomer can be present with the aqueous solution when the ethylene contacts the aqueous solution. Examples of alpha unsaturated monomers which can be used in the scope of the subject invention include alkyl vinyl compounds having from about 3 to about 24 carbon atoms; vinyl organic acids such as acrylic acid, methacrylic acid, itaconic acid; alkyl acrylate esters such as methacrylate, butylacrylate, and methyl methacrylate; acrolein; acrylonitrile; a styrenic compound such as styrene, alpha methylstyrene, dibromostyrene, 2-chlorostyrene, 4-chlorostyrene and vinyl toluene; disubstituted olefins such as maleic anhydride, maleimide, N-methylmaleimide, N-ethylmaleimide, diethylmaleate, maleic acid, vinylene carbonate, and sodium maleate; vinyl esters such as vinyl acetate, vinyl butyrate, vinyl propanate, ethyl vinyl ether, and isopropenylacetate and the like; and vinyl halides such as vinyl chloride, vinylidene chloride, 2-chloroethyl acrylate, 4-chlorobutylacrylate, 2-bromoethyl methacrylate, 2-chloroethyl methacrylate, 4-chlorobutyl methacrylate, 2-bromoethyl methacrylate, bis-beta(chloroethyl vinyl) phosphonate and the like.

In addition to simple copolymers of ethylene and another alpha unsaturated monomer, terpolymers of ethylene with two different alpha unsaturated monomers can be produced in accordance with the subject invention. A particularly preferred terpolymer is made by copolymerizing ethylene, an acrylic compound such as acrylic acid, and an alpha olefin having from about 3 to about 24 carbon atoms. The most preferred such terpolymer is made by including from about 0.5 to about 2% by weight based on the aqueous medium of acrylic acid and from about 0.1 to about 2% by weight based on the aqueous medium of the alpha olefin within the aqueous medium and thereafter contacting the medium with ethylene.

Generally, when the ethylene is copolymerized in the presence of another polymerizable monomer or monomers, greater amounts of initiator can be utilized than when the ethylene is polymerized alone. For example, with all of the emulsifiers set forth above, the initiator amount can be as high as 1 percent by weight of the aqueous medium. In addition, the temperature of polymerization can be as high as 150°C when copolymerization takes place.

The reaction can be carried out in either a batch or continuous operation. In carrying out the polymerization process in accordance with the present invention, water, the alkyl mercaptan, the emulsifier, the initiator, and another nonvaporous monomer (if desired) are combined in any order in the amounts or proportions which are recited above. The components are mixed in a suitable pressure reactor, or a premixed aqueous phase is introduced into the suitable aqueous reactor. The reactor is equipped with a stirring mechanism in which fairly vigorous agitation of the contents is possible either by motion of the reactor or by agitating means of the reactor. The reactor is suitably made of a corrosion resistant material such as stainless steel or is equipped with a corrosion resistant lining such as glass or stainless steel. The reactor is then flushed with polymerization grade (99.8+% pure) ethylene to remove gaseous oxygen from the system. Preferably the polymerization grade ethylene contains less than 10–25 ppm of oxygen.

In some instances, it is desirable to initially add all ingredients but the initiator to the reactor and then heat the reactor to the operating temperature as set forth above, and then the initiator is introduced into the reactor, conveniently dissolved in a portion of the water component of the aqueous medium. In this instance, the initiator is conveniently added to the reaction zone in a sufficient quantity to produce a polymerization rate of about 5% per hour.

High pressure polymerization grade ethylene (and, if desired, other vaporous monomer) is introduced into the reactor. The pressure of the ethylene can be dependent upon the emulsifier as stated above. The reaction proceeds at the temperatures and pressures set forth above with constant vigorous agitation of the liquid contents of the reactor. As the polymerization proceeds, additional ethylene is continuously fed into the reactor to maintain the pressure. The polymerization is permitted until the emulsion reaches the desired solids content. This can be done by periodically withdrawing samples from the reactor and plotting the solids content as a function of time. A leveling off of the plotted solids content indicates that the reaction is slowing down and that the initiator is becoming depleted by thermal decomposition. When this happens, additional initiator can be added in small increments to maintain the polymerization rate of about 5% per hour. The emulsion produced will generally have a solids content of between about 15 and 25 weight percent.

Following the polymerization, the latex can be concentrated by distillation under reduced pressure until the solids content is up to about 45 weight percent without adverse effect on the stability of the emulsion.

The resulting stable emulsions produced by the subject invention are unexpectedly compatible with conventional clear polish formulations and contribute to improved properties of these compositions. Such conventional clear polish formulations have a light transmission ranging from 99+% to about 60% and are generally used as floor polishes, vinyl coatings, leather coatings, patent leather coatings and the like.

Clear liquid aqueous emulsion floor polishes generally comprise a clear resin latex component, including alkali soluble and alkali insoluble components, and leveling and plasticizing agents and fluxes. Depending on the characteristics desired in the final polish, the clear ethylene polymer emulsions of the subject invention can be employed in proportions that constitute between about 5 and about 95% by weight of the total solids dispersed in such clear polish formulations.

A variety of clear emulsions of resins are known in the polish formulating art, including acrylic emulsions, styrene-maleic anhydride copolymer resin emulsions, sytrene-acrylic copolymer emulsions, alkali-soluble acrylic and styrene-acrylic polymers, solution polymers of acrylates and styrene acrylics.

Suitable leveling agents, plasticizers or fluxers known to the art for use in wax polish formulations include phthalate plasticizers such as dibutylphthalate, alkylphosphate plasticizers such as tributylphosphate or tributyloxyethylphosphate, n-octanol and fluoroalkyl leveling agents taught in U.S. Pat. No. 2,937,098. The clear ethylene polymer emulsions of the subject invention are more compatible than the conventional translucent polyethylene emulsions within the above described clear polish formulations. Also, the presence of these clear ethylene polymer emulsions increases scuff and scratch resistance, slip resistance, gloss, black heel mark resistance, durability and stability without effecting detergent resistance and removability of the conventional clear polish formulation.

The following examples are set forth to better facilitate the understanding of this invention and are not intended to limit the scope thereof:

EXAMPLE I

A 2000 gallon high pressure stainless steel reactor was charged with a solution containing 94.9% by weight deionized water, 3.5% by weight dodecyl benzene sulfonic acid, 0.5% by weight tert-dodecyl mercaptan, 0.6% by weight sodium hydroxide, and 0.5% by weight of potassium persulfate. The reactor was flushed, sealed and heated to 100°C and pressurized to 2200 psi with polymerization grade polyethylene containing less than 25 ppm of oxygen. The pressure was maintained in the interior of the reactor by means of an automatically operated control valve supplying ethylene from a compressor. The temperature was automatically maintained at a constant level of 100°C by means of an electronically controlled thermostat and internal cooling coils. The reaction began immediately, and reaction samples were removed from the reactor at 30 minute intervals after the initiation began. The solids content of the samples was determined by means of moisture balance. When the samples reached 17.5 weight percent solids, the polymerization was terminated by shutting off the ethylene supply, cooling the reactor, and stopping the motion of the agitators. The contents of the reactor was discharged into a receiving vessel at atmospheric pressure. The total reaction time was 2.5 hours. The product was a fluid, clear latex with no sediment or visible solid particles present. The product was evaporated to a solids level of 30 weight percent. The polymer had an apparent molecular weight range of from 4000 to 6000, an average particle size of 100 angstrom units, and a light transmission of 99.0+% as determined by a Bausch & Lomb "Spectronic 20" spectrophotometer using distilled water as the 100% transmission calibration standard, and using a wave length of 620 millimicrons using a ½ inch transmission cell.

EXAMPLE II

An aqueous feed solution containing 94.9% by weight deionized water, 3.5% by weight of dodecyl benzene sulfonic acid, 0.5% by weight of tertiary dodecyl mercaptan, 0.5% by weight of sodium hydroxide, and 0.5% by weight of potassium persulfate was continuously fed to a 2000 gallon stainless steel reactor which was maintained at 100°C, and a pressure of 2200 psi (by ethylene). The reaction product from the continuous reactor was constantly withdrawn at a rate to maintain a residence time of 2.5 hours and a solids level in the product of 17.5 weight percent. The product was then evaporated to a solids level of 30% by weight. The physical properties of the resulting product were the same as the properties of the product described in the batch process of Example I.

EXAMPLE III

Using the reactor described in Example I, a solution containing 9.18% by weight deionized water, 3.5% by weight of dodecyl benzene sulfonic acid, 0.5% by weight tertiary dodecyl mercaptan, 2.0% by weight of acrylic acid, 1.7% by weight of sodium hydroxide, and 0.5% by weight of potassium persulfate, was charged thereto. The reactor was operated under the same temperature and pressure conditions as set forth in Example I for 2.5 hours to form a product having a 17.5% by weight solids content which was then concentrated by evaporation of water to a solids level of 30% by weight. The product was a fluid clear latex with no sediment or visible solids particles present. The polymer had an apparent molecular weight range of from 3000 to 5000 and an average particle size of less than 100 angstrom units. The latex had a percent light transmission of 99.0+% as determined by the procedure set forth in Example I.

EXAMPLE IV

An aqueous feed solution containing 91.8% by weight deionized water, 3.5% by weight dodecyl benzene sulfonic acid, 0.5% by weight tertiary dodecyl mercaptan, 2.0% by weight of acrylic acid, 1.7% by weight sodium hydroxide, and 0.5% by weight of potassium persulfate was fed to the continuous reactor described in Example II and operated under the same pressure and temperature conditions to produce a product having a solids level of 17.5 weight percent. The product was evaporated to a solids level of 30 weight percent and had the same properties as the product which was produced in accordance with Example III above.

EXAMPLE V

Using the reactor described in Example I, a solution containing 91.3% by weight of deionized water, 3.5% by weight dodecyl benzene sulfonic acid, 0.5% by weight tertiary dodecyl mercaptan, 2.0% by weight acrylic acid, 1.7% by weight sodium hydroxide, 0.5% by weight of potassium persulfate, and 0.5% by weight of $C_{18}$ alpha olefin. The reaction was carried out under the same conditions, procedures and residence time as that set forth in Example I. The product was a fluid clear latex with no sediment or visible solid particles present. The product was evaporated to a solids level of 30 weight percent and it was found that the polymer had an apparent molecular weight of between 3000 and 5000, an average particle size of less than 100 angstrom units and a percent light transmission of greater than 99% as determined by the procedure set forth in Example I.

EXAMPLE VI

An aqueous feed solution containing 91.3% by weight deionized water, 3.5% by weight dodecyl benzene sulfonic acid, 0.5% by weight tertiary dodecyl mercaptan, 2.0% by weight acrylic acid, 1.7% by weight sodium hydroxide, 0.5% by weight potassium persulfate, and 0.5% by weight of $C_{18}$ alpha olefin was continuously fed to the 2000 gallon stainless steel continuous reactor described in Example II. The reaction was carried out under the same conditions, procedures and residence time as the reaction set forth in Example II. The product obtained from the reaction had the same properties as that set forth in Example V.

EXAMPLE VII

The polyethylene terpolymer emulsion was produced in Example VI was formulated in three floor polish compositions A, B and C as shown in Table 1 below. Each composition had a total solids content of 15 weight percent and a pH which ranged from 8.8 to 9.0.

Table 1

| Component | Polish Composition (Parts by Weight) | | |
| --- | --- | --- | --- |
|  | A | B | C |
| An acrylic dispersion (at 15 weight percent solids) sold under the trademark of RHOPLEX B-505 by Rhom & Haas Company | 95.0 | 90.0 | 85.0 |
| The polyethylene emulsion produced in accordance with the Example VI (at 15 weight percent solids) | 5.0 | 10.0 | 15.0 |
| Tributoxyethylphosphate | 1.0 | 1.0 | 1.0 |
| Diethylene glycol monobutyl ether | 3.5 | 3.5 | 3.5 |
| Dibutyl phthalate | 0.7 | 0.7 | 0.7 |
| Fluorocarbon sold under the trademark of FC-128 by | 0.5 | 0.5 | 0.5 |

Table 1-continued

Minnesota Mining & Mfg. Co. (at 1 weight percent solids)

The polish compositions A, B and C, the base compositions (acrylic latex and additives), and the polyethylene emulsion components had the percent light transmission values set forth in Table 2 below:

Table 2

| Emulsion | % Light Transmission* |
| --- | --- |
| Polyethylene emulsion | 99+ |
| Polish Composition A | 91.5 |
| Base Composition A (Polish Composition A without polyethylene emulsion) | 91.5 |
| Polish Composition B | 77 |
| Base Composition B (Polish Composition B without polyethylene emulsion) | 77 |
| Polish Composition C | 63 |
| Base Composition C (Polish Composition C without polyethylene emulsion) | 63 |

*as determined by the method set forth in Example I

As can be seen from Table 2, when using the clear ethylene polymer emulsion produced in accordance with the subject invention which has a light transmission of greater than 99%, as an ingredient within a conventional clear polish composition, the light transmission of each polish composition is the same as that of the base composition for each of the formulations. Thus, when using the novel clear polyethylene emulsions of the subject invention in polish compositions the light transmission through each polish composition will increase as the light transmission increases through each base composition.

In addition, each of the base compositions A, B and C which are identified in Table 2 and each of the polish compositions A, B and C were tested in accordance with standard floor polish testing techniques. It was found that each of the polish compositions A, B and C which contain the polyethylene emulsion had improved scuff and scratch resistance, black heel mark resistance, jetness of gloss, slip resistance, durability and flexibility of the film over that of the base compositions A, B and C respectively. In addition, the resultant films formed from each polish composition A, B and C were clear and the polyethylene emulsion constituent did not contribute to any discoloration upon aging. In addition, the presence of the polyethylene constituent within the polish compositions A, B and C did not affect the balance between detergent resistance and removability which is present in each of the base compositions A, B and C, respectively.

EXAMPLE VIII

The polyethylene terpolymer emulsion as produced in Example VI was formulated in 6 different coating compositions which are conventionally used as vinyl coatings, leather coatings, and patent leather coatings. These compositions are identified as compositions D, E, F, G, H and I in Table 3 below. Each composition had a total solids content of 15 weight percent and a pH which ranged between 8.8 to 9.0.

Table 3

| Composition | Coating Composition (Parts by Weight) |
| --- | --- |

Table 3-continued

|  | D | E | F | G | H | I |
|---|---|---|---|---|---|---|
| An acrylic dispersion (at 15 weight percent solids) sold under the trademark of RICHAMER R-820 by The Richardson Co. | 95.0 | 90.0 | 85.0 |  |  |  |
| An acrylic dispersion (at 15 weight percent solids) sold under the trademark of CRILICON 642 by Ionac Chemical Co. |  |  |  | 95.0 | 90.0 | 85.0 |
| The polyethylene emulsion produced in accordance with Example VI (at 15 weight percent solids) | 5.0 | 10.0 | 15.0 | 5.0 | 10.0 | 15.0 |
| Tributoxyethylphosphate | 1.0 | 1.0 | 1.0 | 1.0 | 1.0 | 1.0 |
| Diethylene glycol monobutyl ether | 3.5 | 3.5 | 3.5 | 3.5 | 3.5 | 3.5 |
| Dibutyl phthalate | 0.7 | 0.7 | 0.7 | 0.7 | 0.7 | 0.7 |
| Fluorocarbon sold under the trademark of FC-128 by Minnesota Mining & Mfg. Co. (at 1 weight percent solids) | 0.5 | 0.5 | 0.5 | 0.5 | 0.5 | 0.5 |

The coating compositions D, E, F, G, H, and I, the base compositions therefor and the polyethylene emulsion component for each had the light transmission values set forth in Table 4 below.

Table 4

| Emulsion | % Light Transmission* |
|---|---|
| Polyethylene emulsion | 99+ |
| Coating Composition D | 92.5 |
| Base Composition D (Coating Composition D without polyethylene emulsion) | 92.5 |
| Coating Composition E | 78.5 |
| Base Composition E (Coating Composition E without polyethylene emulsion) | 78.5 |
| Coating Composition F | 64.0 |
| Base Composition F (Coating Composition F without polyethylene emulsion) | 64.0 |
| Coating Composition G | 90.0 |
| Base Composition G (Coating Composition G without polyethylene emulsion) | 90.0 |
| Coating Composition H | 75.0 |
| Base Composition H (Coating Composition H without polyethylene emulsion) | 75.0 |
| Coating Composition I | 60.0 |
| Base Composition I (Coating Composition I without polyethylene emulsion) | 60.0 |

*as determined by the method set forth in Example I.

It is clear from a study of Table 4 that the polyethylene emulsion component does not contribute to any decrease in light transmission of each coating composition since the light transmission of each coating composition is identical to that of its base composition. In addition, each of the base compositions D through I and each of the polish compositions D through I were tested by conventional polish testing methods and it was found that the presence of the polyethylene in the polish compositions D through I greater improved the scuff and scratch resistance, gloss, adhesion and flexibility of the films as compared to the films formed from the base compositions alone. Each polish composition laid down a film that was clear and exhibited no discoloration upon aging.

While this invention has been described in relation to its preferred embodiments, it is to be understood that various modifications thereof will be apparent to one skilled in the art upon reading the specification and it is intended to cover such modification as fall within the scope of the appended claims.

We claim:

1. A clear liquid polish composition comprising an aqueous dispersion of ethylene polymer particles in combination with dispersed particles of a resin, said resin being conventional in liquid polish compositions and said ethylene polymer particles comprising particles of a size of no larger than about 100 angstrom units prepared by polymerizing ethylene under a greater than atmospheric pressure by contacting gaseous ethylene with an aqueous medium maintained at an elevated temperature in the range of from about 70°C to about 150°C, said medium containing a water soluble salt of persulfuric acid as initiator in an amount effective to initiate polymerization, from about 2 to about 5 percent by weight of said aqueous medium of an anionic emulsifier, and from about 0.3 to about 0.7 percent by weight of said aqueous medium of an alkyl mercaptan having from about 4 to about 20 carbon atoms.

2. The clear liquid polish of claim 1 wherein said anionic emulsifier is a water soluble salt of an alkyl aryl sulfonate.

3. The clear liquid polish of claim 2 wherein said emulsifier is selected from sodium and potassium salts of alkyl benzene sulfonates wherein the alkyl group has from about 6 to about 18 carbon atoms.

4. The clear liquid polish of claim 1 wherein said alkyl mercaptan is a branched chain alkyl mercaptan having at least 10 carbon atoms.

5. The clear liquid polish of claim 4 wherein said alkyl mercaptan is present in an amount of about 0.4 weight percent of said aqueous medium.

6. The clear liquid polish of claim 5 wherein said alkyl mercaptan is tertiary dodecyl mercaptan.

7. The clear liquid polish of claim 1 wherein said ethylene is contacted with another alpha unsaturated monomer to form copolymer particles in said emulsion.

8. The clear liquid polish of claim 7 wherein said other alpha unsaturated monomer is selected from alkyl vinyl compounds having from about 3 to about 24 carbon atoms, vinyl organic acids, alkyl acrylate esters, styrenic compounds, disubstituted olefins, vinyl esters and mixtures thereof.

9. The clear liquid polish of claim 7 wherein said polymer comprises a terpolymer of ethylene, an acrylic compound, and one of said alkyl vinyl compounds.

10. In a clear liquid polish composition which has a light transmission of at least about 60 percent and which contains an aqueous dispersion of resin particles and other additives including those selected from leveling agents, plasticizers, and fluxes, the improvement comprising:

a clear latex component admixed therein which latex has a light transmission of at least about 95% and comprises emulsion polymerized polymer particles selected from polymers and copolymers of ethylene which have an average size no larger than about 100 angstrom units, said polymer particles being formed by polymerizing ethylene under a greater than atmospheric pressure by contacting gaseous ethylene with an aqueous medium maintained at an elevated temperature in the range of from about 70°C to about 150°C, said medium containing a water soluble salt of persulfuric acid as initiator in an amount effective to initiate polymerization, from about 2 to about 5 percent by weight of said aqueous medium of an anionic emulsifier, and from about 0.3 to about 0.7 percent by weight of said aqueous medium of an alkyl mercaptan having from about 4 to about 20 carbon atoms.

11. The improved polish composition of claim 10 wherein said clear latex has a light transmission of at least about 99%.

12. The improved polish composition of claim 11 wherein said emulsifier is selected from sodium and potassium salts of alkyl benzene sulfonic acid wherein the alkyl group has from about 6 to about 18 carbon atoms.

13. The improved polish composition of claim 10 wherein said polymer in said clear latex is polyethylene.

14. The improved polish composition of claim 10 wherein said polymer in said clear latex is a copolymer of ethylene.

15. The improved polish composition of claim 14 wherein said copolymer comprises a copolymer of ethylene and an alpha unsaturated monomer selected from alkyl vinyl compounds having from about 3 to about 24 carbon atoms, vinyl organic acids, alkyl acrylate esters, styrenic compounds, disubstituted olefins, vinyl esters and mixtures thereof.

16. The improved polish of claim 15 wherein said copolymer is a terpolymer of ethylene, an acrylate compound, and an alkyl vinyl compound having from about 3 to about 24 carbon atoms.

17. The improved polish of claim 10 wherein said clear latex is contained therein in an amount ranging from about 5 to about 95 weight percent thereof.

* * * * *